US012045432B2

United States Patent
Luckey et al.

(10) Patent No.: US 12,045,432 B2
(45) Date of Patent: Jul. 23, 2024

(54) INTERACTIVE VIRTUAL INTERFACE

(71) Applicant: Anduril Industries Inc., Irvine, CA (US)

(72) Inventors: Palmer F. Luckey, Newport Beach, CA (US); Jason Levin, Costa Mesa, CA (US); Julian Hammerstein, Murrieta, CA (US); Joseph Chen, Irvine, CA (US); Maximillian Zheng Wang, Irvine, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 14 days.

(21) Appl. No.: 17/497,704

(22) Filed: Oct. 8, 2021

(65) Prior Publication Data

US 2022/0027038 A1      Jan. 27, 2022

Related U.S. Application Data

(63) Continuation of application No. 16/201,882, filed on Nov. 27, 2018, now Pat. No. 11,182,043.

(51) Int. Cl.
*G06F 3/04815* (2022.01)
*G01S 7/51* (2006.01)
(Continued)

(52) U.S. Cl.
CPC ............ *G06F 3/04815* (2013.01); *G01S 7/51* (2013.01); *G01S 17/42* (2013.01); *G06F 3/017* (2013.01);
(Continued)

(58) Field of Classification Search
CPC .... G06F 3/04815; G06F 3/017; G06F 3/0482; G06F 3/167; G06F 9/451; G01S 7/51;
(Continued)

(56) References Cited

U.S. PATENT DOCUMENTS

| 7,693,348 B2 | 4/2010 | Zavadsky |
| 9,317,133 B2 | 4/2016 | Korah |

(Continued)

FOREIGN PATENT DOCUMENTS

| JP | 2016127571 | 7/2016 |
| JP | 2016522463 | 7/2016 |
| WO | 2018170512 | 9/2018 |

OTHER PUBLICATIONS

Assetto Corsa Mods, "LIDAR (Point Cloud) to mesh tutorial", Jan. 31, 2017, available at https://assettocorsamods.net/threads/lidar-point-cloud-to-mesh-tutorial.422/.
(Continued)

*Primary Examiner* — Andrey Belousov
(74) *Attorney, Agent, or Firm* — Van Pelt, Yi & James LLP

(57) ABSTRACT

A system for display and interaction includes an interface and a processor. The interface is configured to receive data from one or more sensors. The processor is configured to convert the data to a common synthetic data space; provide the common synthetic data space for display; receive a command associated with an object represented in the common synthetic data space; and cause display of an icon indicating a command has been issued.

20 Claims, 12 Drawing Sheets

(51) Int. Cl.
*G01S 17/42* (2006.01)
*G06F 3/01* (2006.01)
*G06F 3/0482* (2013.01)
*G06F 3/16* (2006.01)
*G06F 9/451* (2018.01)
*G06T 15/20* (2011.01)
*G06T 17/20* (2006.01)

(52) U.S. Cl.
CPC ............ *G06F 3/0482* (2013.01); *G06F 3/167* (2013.01); *G06F 9/451* (2018.02); *G06T 15/20* (2013.01); *G06T 17/20* (2013.01)

(58) Field of Classification Search
CPC ......... G01S 17/42; G06T 15/20; G06T 17/20; G06T 2200/24; G06T 2219/2004; G06T 2219/2012; G06T 19/20
See application file for complete search history.

(56) References Cited

U.S. PATENT DOCUMENTS

| | | | |
|---|---|---|---|
| 9,652,896 | B1 | 5/2017 | Jurgenson |
| 10,278,001 | B2 | 4/2019 | Edry |
| 2005/0289458 | A1* | 12/2005 | Kylmanen ............... G06F 16/95 707/E17.107 |
| 2009/0187862 | A1 | 7/2009 | Dacosta |
| 2009/0222742 | A1 | 9/2009 | Pelton |
| 2011/0305405 | A1 | 12/2011 | Kawamura |
| 2012/0086727 | A1 | 4/2012 | Korah |
| 2012/0324353 | A1 | 12/2012 | Torbey |
| 2013/0231779 | A1 | 9/2013 | Purkayastha |
| 2014/0125768 | A1* | 5/2014 | Bell ....................... H04N 13/10 348/46 |
| 2014/0173439 | A1* | 6/2014 | Gutierrez ................ H04L 43/10 715/738 |
| 2014/0306866 | A1 | 10/2014 | Miller |
| 2016/0036817 | A1 | 2/2016 | Adam |
| 2017/0200309 | A1 | 7/2017 | Qian |

OTHER PUBLICATIONS

Brandon et al.: "VETO: An Immersive Virtual Environment for Tele-Operation", Jun. 8, 2018, Retrieved from the Internet: URL: https://pdfs.semanticscholar.org/af34/fa7c4eb56697c289e3dbbb7e7ed7c17e4ed2.pdf?_ga=2.227491677.175444601.1661338183-1830897573.1621253495 [retrieved on Aug. 24, 2022].

Gregorij et al: "3D teleimmersion for collaboration and interaction of geographically distributed users", Virtual Reality, vol. 17, No. 1, Mar. 1, 2013, pp. 29-43, Retrieved from the Internet: URL: https://link.springer.com/content/pdf/10.1007/s10055-012-0217-2.pdf>.

Orts-Escolano et al: "Holoportation", User Interface Software and Technology, ACM, 2 Penn Plaza, Suite 701 New York NY 10121-0701 USA, Oct. 16, 2016, pp. 741-754.

* cited by examiner

INTERACTIVE VIRTUAL INTERFACE

CROSS REFERENCE TO OTHER APPLICATIONS

This application is a continuation of U.S. patent application Ser. No. 16/201,882, now U.S. Pat. No. 11,182,043, entitled INTERACTIVE VIRTUAL INTERFACE filed Nov. 27, 2018 which is incorporated herein by reference for all purposes.

BACKGROUND OF THE INVENTION

Electronic viewing technologies enable the display of content—for example, text, images, moving images, and other visual media—for many types of devices, including personal computers and mobile devices, across a wide range of applications. Flat screen display technology is the primary electronic viewing technology used for the visualization of the abovementioned types of content. Flat screen display technology is well established and has been shown to be reliable. Although flat screen display technology is constantly evolving, there are certain limitations inherent in the technology. For example, in the common case where only one conventional flat screen is viewed by a pair of eyes, it is not possible to fully recreate stereo vision, the parallax effect, and the sense of scale experienced when each eye is afforded a view of a visual representation from a slightly different angle. These limitations are more pronounced when what is displayed is a real-world environment or a representation of a real-world environment. Therefore, there exists a need for a way to more effectively display representations of real-world environments and the objects they contain, as well as to promote more effective interaction with such representations.

BRIEF DESCRIPTION OF THE DRAWINGS

Various embodiments of the invention are disclosed in the following detailed description and the accompanying drawings.

DETAILED DESCRIPTION

Figure 1:
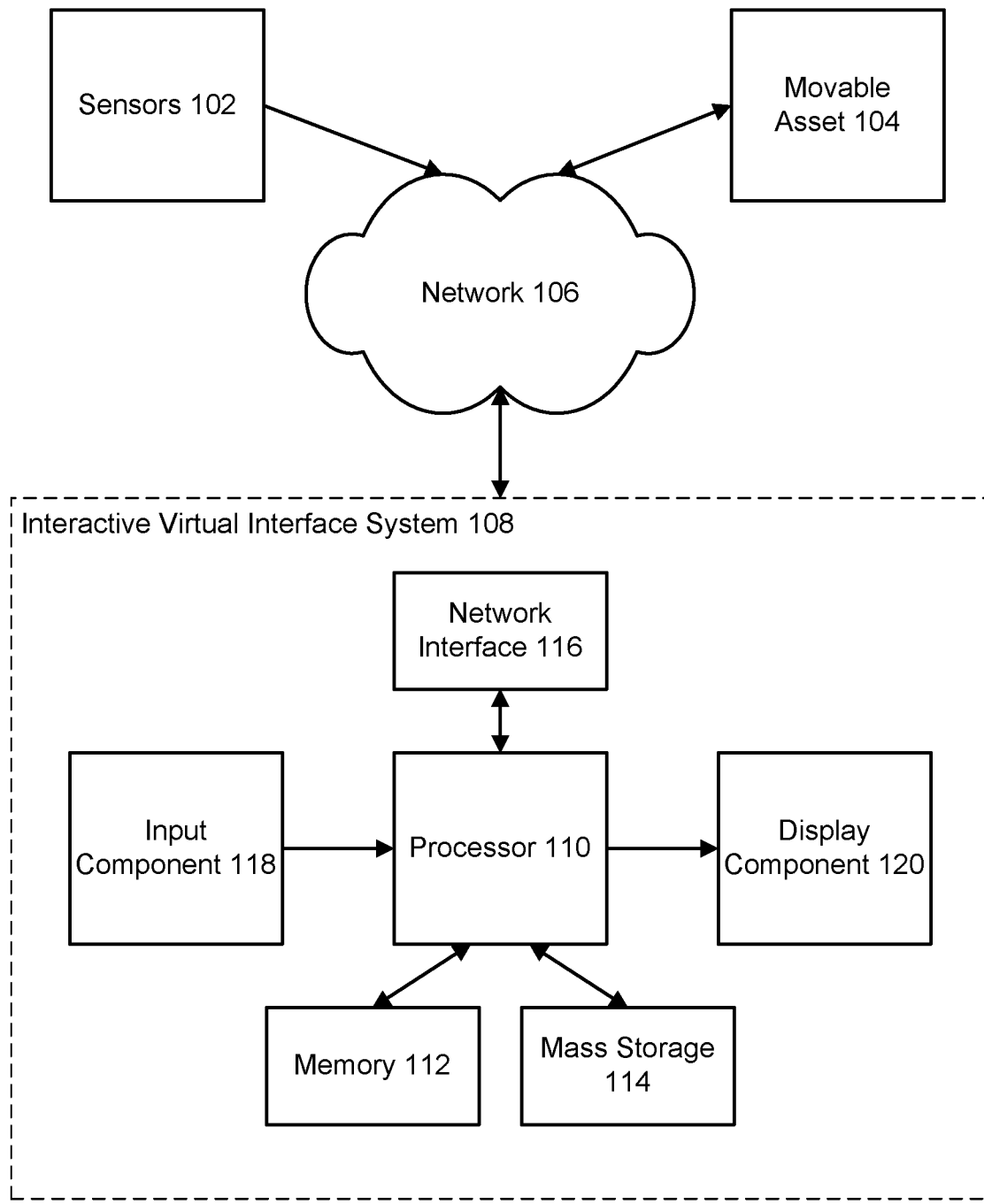
FIG. 1 is a block diagram illustrating an embodiment of a system for displaying and providing for interaction with a common synthetic data space.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for display and interaction is disclosed. The system comprises an interface and a processor. The interface is configured to receive data from one or more sensors. The processor is configured to convert the data to a common synthetic data space; provide the common synthetic data space for display; and receive a command associated with an object represented in the common synthetic data space. In some embodiments, the processor is coupled to a memory that stores instructions for the processor.

Displaying and providing for interaction with a common synthetic data space is disclosed. In various embodiments, the common synthetic data space is a representation of a real-world environment containing real-world objects (i.e., the common synthetic data space represents a place that physically exists in the world). For example, the real-world environment that is represented could be a wilderness region that has hills, sparse vegetation (e.g., bushes and occasional trees), and a few structures made by humans (e.g., a few buildings and roads). Examples of real-world objects contained in the real-world environment include animals, humans, cars, and other objects. The common synthetic data space may be displayed as a photorealistic or less than photorealistic rendering. It may also have a combination of renderings that are photorealistic and renderings that are less than photorealistic. The common synthetic data space is common in the sense that representations of the real-world objects that are captured all reside in the same data space. The common synthetic data space is synthetic in the sense that there may be synthetic elements, such as tags and labels, attached to representations of real-world objects. Sensors are used to capture the real-world environment and its real-world objects. Examples of sensors include light detection and ranging (LIDAR), optical, and thermal sensors. Satellite imagery can be used to supplement the other types of sensor data to capture terrain and other features, such as roads and buildings, that are unlikely to change frequently. The data from sensors and satellite images are used to create the common synthetic data space. Creation of the common synthetic data space requires converting one or more sets of lower dimensional sensor data to higher dimensional representations that are overlaid onto and geo-rectified with a coordinate system corresponding to the real-world environment. In various embodiments, a virtual reality display device is used to display the common synthetic data space. An example of a virtual reality display device is a headset stereoscopic display that presents a different view of a virtual scene to each eye. One or more layers of sensor data can be rendered on top of a representation of a real-world environment from a selected point of view and at a selected scale. For example, thermal data can be displayed as overlaid on top of photorealistic images. Objects are displayed, and metadata associated with objects (e.g., identifying labels and icons representing uncertainty with respect to identification and/or position) may also be displayed. In some embodiments, alerts are presented. For example, an alert may be presented if new tracks appearing to be human tracks are detected. In various embodiments, the common synthetic data space can be interacted with, and commands associated with objects in the synthetic data space can be issued. The commands typically correspond to real-world actions on the real-world objects corresponding to the objects in the common synthetic data space. For example, a monitor command could be issued with respect to an object, which would trigger a real-world action of sending an asset (e.g., a drone, manned vehicle, or a human) to monitor a real-world object. Commands may be issued in a variety of ways. Examples include selection from a menu, voice commands, hand gesture commands, and commands from traditional input devices (e.g., a keyboard and mouse combination). In some embodiments, interface devices are worn. For example, gloves with position sensors can be used to track hand movements used to interact with objects in the common synthetic data space. In some embodiments, multiple operators are able to direct assets (e.g., drones, manned vehicles, and humans) and issue commands with respect to assets. In these embodiments, various approaches for managing this type of multi-user interaction can be used. For example, users can grant each other permission to direct assets, a moderator can decide who may direct assets, and/or an automated contention model can be employed.

In some embodiments, the system enables the scale and perspective provided to one or more users to vary based on role or other factors (e.g., user ID, group, company, rank, etc.). For example, a commander is enabled to have improved pan/zoom/perspective controls as compared to the pan/zoom/perspective controls of a tactical guy.

The system provides improved interaction with a computer system. In particular, the synthetic data space enables a user to visualize important data related to objects and interact with the objects or interact with assets that can be deployed to observe the objects in the real space that corresponds to the synthetic data space. In some cases, the system enables monitoring of a real outdoor area or boundary area that requires monitoring for events that include objects, people, animals that travel through the outdoor area or across the boundary area. The interaction with the synthetic data space is designed to be intuitive to simplify issuance of complex commands associated with devices that interact and observe the real space corresponding to the synthetic space.

FIG. 1 is a block diagram illustrating an embodiment of a system for displaying and providing for interaction with a common synthetic data space. In the example shown, the system for displaying and providing for interaction with a common synthetic data space includes sensors 102, movable asset 104, network 106, and interactive virtual interface system 108. Sensors 102 provide data used to create a common synthetic data space representing a real-world environment containing real-world objects. Examples of sensors include LIDAR components (including one or more photodetectors that detect reflected light produced by one or more lasers), other optical instruments (including one or more optical cameras capable of capturing still and/or moving images), and thermal cameras. In some embodiments, sensors (e.g., LIDAR, optical cameras, and thermal cameras) are mounted on tower stations in the real-world environment that is to be captured. In some embodiments, the sensors are mounted at a height such that the terrain of the real-world environment is visible to the sensors, and the number and placement of the tower stations is chosen to provide sufficient coverage of the terrain of the real-world environment. Tower stations may also be equipped with global positioning system (GPS) locators in order to allow for the determination of physical coordinates of the tower stations. In some embodiments, sensors (e.g., LIDAR, optical cameras, and thermal cameras) are mounted on aerial drones. Sensor data collected by aerial drones may be used to supplement data collected by other means. In the example shown in FIG. 1, sensors 102 provide input (i.e., sensor data input) to interactive virtual interface system 108 via network 106. In the example shown, movable asset 104 is also connected to interactive virtual interface system 108 via network 106. In some embodiments, movable asset 104 is an autonomous device. For example, movable asset 104 could be a drone (either aerial or non-aerial) that can execute commands issued to it via network 106. An example of a command that could be executed is surveilling and/or tracking an object in the real-world environment. In some embodiments, movable asset 104 is a manned vehicle (e.g., an airplane or a truck) or one or more humans. Movable asset 104 receives commands via network 106. Moveable assets will typically have metadata associated with them, for example, metadata pertaining to access controls and the types of commands that can be issued to the asset.

In the example shown in FIG. 1, network 106 connects sensors 102, movable asset 104, and interactive virtual interface system 108. Examples of network 106 include one or more of the following: a direct or indirect physical communication connection, mobile communication network, Internet, intranet, Local Area Network, Wide Area Network, Storage Area Network, and any other form of connecting two or more systems, components, or storage devices together. In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. For example, additional instances of movable asset 104 may exist. The components are not necessarily located in the same geographic location. For example, interactive virtual interface system 108 does not need to be in the same geographic location as sensors 102 or movable asset 104.

In the example shown in FIG. 1, interactive virtual interface system 108 includes processor 110, memory 112, mass storage 114, network interface 116, input component 118, and display component 120. Other system architectures and configurations can be used to display and provide for interaction with a common synthetic data space. Interactive virtual interface system 108, which includes various subsystems as described below, includes at least one microprocessor subsystem (also referred to as a processor or a central processing unit (CPU)). For example, processor 110 can be implemented by a single-chip processor or by multiple processors. In some embodiments, processor 110 is a general-purpose digital processor that controls the operation of interactive virtual interface system 108. Using instructions retrieved from memory 112, processor 110 controls the reception and manipulation of sensor data passed from sensors 102, receives commands to be issued from input component 118, and outputs a rendering of the common synthetic data space to display component 120. Processor 110 is coupled bi-directionally with memory 112, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 110. Also, as is well known in the art, primary storage typically includes basic operating instructions, program code, data, and objects used by processor 110 to perform its functions (e.g., programmed instructions). Memory 112 can include any suitable computer readable storage media, described below, depending on whether, for example, data access needs to be bi-directional or uni-directional. Processor 110 can also directly and very rapidly retrieve and store frequently needed data in a cache memory (not shown). Mass storage 114 provides additional data storage capacity for interactive virtual interface system 108 and is coupled either bi-directionally (read/write) or uni-directionally (read only) to processor 110. For example, mass storage 114 can include computer readable media such as flash memory, portable mass storage devices, and other storage devices. Mass storage 114 generally stores additional programming instructions, data, and the like that typically are not in active use by processor 110. It will be appreciated that the information retained within mass storage 114 can be incorporated, if needed, in standard fashion as part of memory 112 (e.g., RAM) as virtual memory. Network interface 116 allows processor 110 to be coupled to network 106. Through network interface 116, processor 110 can receive information (e.g., sensor data) from sensors 102 and output commands to movable asset 104. An interface card or similar device and appropriate software implemented by (e.g., executed/performed on) processor 110 can be used to connect interactive virtual interface system 108 to network 106 and transfer data according to standard protocols.

Input component 118 inputs commands associated with objects in the common synthetic data space to processor 110, which processes and transmits the commands. For example, a command that could be given with respect to an object in the common synthetic data space (corresponding to a real-world object) is a command to surveil and track the object with a drone. In some embodiments, input component 118 includes a wearable interface device. For example, gloves with position sensors can be used to track hand movements used to interact with objects in the common synthetic data space. Position sensors are used to link a glove's movements to a visual cue (e.g., a representation of a hand) in the common synthetic data space. Certain movements correspond to actions with respect to objects in the common synthetic data space. For example, tapping on an object in the common synthetic data space may bring up a menu of commands associated with the object. In some embodiments, input component 118 includes a microphone configured to receive voice commands. In some embodiments, input component 118 includes a traditional input device, such as a keyboard and mouse combination. In some embodiments, more than one input device is included. For example, a wearable interface device, a microphone, and a keyboard/mouse may be included so that it is possible to input commands via any of these devices. Display component 120 is a virtual reality display device that is used to display the common synthetic data space. An example of a virtual reality display device is a headset stereoscopic display that presents a different view of a virtual scene to each eye. In various embodiments, the headset has stereo headphones and head motion tracking sensors (e.g., gyroscopes and accelerometers) for three-axis head tracking. In some embodiments, eye-tracking sensors (e.g., video-based eye trackers) are included in the headset. In some embodiments, measurements of head movements tracked by positional sensors are combined with measurements of tracked eye movements to detect gaze direction. The common synthetic data space may be displayed as a photorealistic or less than photorealistic rendering. It may also have a combination of renderings that are photorealistic and renderings that are less than photorealistic. For example, moving objects, as detected and captured by optical imaging sensors, may be displayed as photorealistic representations while background terrain may be displayed as a less than photorealistic rendering. In addition, metadata, such as identifying tags and labels, appear as synthetic images (e.g., icons) that are not photorealistic. Components not shown in FIG. 1 may also exist.

Figure 2:
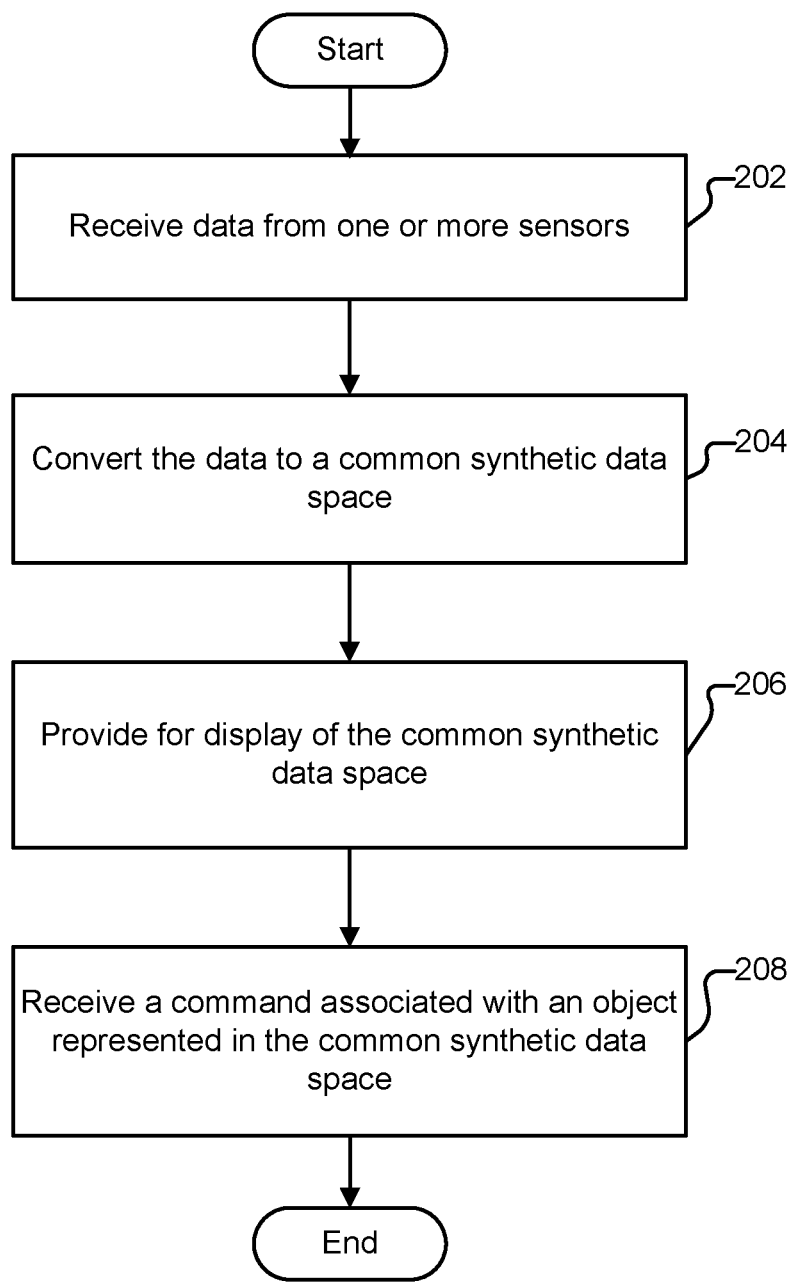
FIG. 2 is a flow chart illustrating an embodiment of a process for displaying and providing for interaction with a common synthetic data space.

FIG. 2 is a flow chart illustrating an embodiment of a process for displaying and providing for interaction with a common synthetic data space. In some embodiments, the process of FIG. 2 is implemented in interactive virtual interface system 108 of FIG. 1.

At 202, data from one or more sensors is received. In some embodiments, sensors 102 of FIG. 1 provide the sensor data. Examples of sensors include light detection and ranging (LIDAR), optical, and thermal sensors. Sensors are used to capture a real-world environment and the objects it contains. Satellite imagery can be used to supplement the other types of sensor data to capture terrain and other features, such as roads and buildings, that are unlikely to change frequently. Satellite imagery is used to capture the overall layout and key features of a real-world terrain. For example, for a terrain that is a wilderness region that is relatively flat and sparse (e.g., low hills and areas with occasional bushes and short trees) and has a few buildings and roads, satellite imagery can be used to create a representation that depicts an overall view of the terrain with the positions of key features (e.g., hills, roads, and buildings) accurately positioned relative to one another. Satellite image data need not be collected and updated in real time because the key features captured (e.g., hills, roads, and buildings) are unlikely to change frequently over time. Historical satellite imagery data may be used. Other types of data are typically collected and updated in real time. For example, data from thermal sensors is typically collected and updated in real time when the data is used to track the movements of objects (e.g., living objects and machine engines) or to track changes in the intensity of a wildfire.

At 204, the data received from one or more sensors is converted to a common synthetic data space. In some embodiments, the conversion of sensor data into a common synthetic data space is performed by processor 110 of FIG. 1. In various embodiments, satellite image data is converted into a backbone representation of a terrain and prominent features of a terrain (e.g., hills, roads, and buildings). This representation may be a photorealistic representation in which the representation is similar to the satellite image data itself. The representation of the terrain and its prominent features may also be a synthetic representation in which a digital representation of the terrain with accurate depictions of its prominent features (e.g., accurate elevations of hills and accurate positions of roads and buildings) is digitally synthesized. For example, a road may be depicted by a digital representation with a label of "road" instead of a photo image of the road. Other sensor data is used to refine the backbone representation created based on satellite image data. For example, LIDAR data is used to more accurately generate three-dimensional maps of key features. LIDAR is typically better suited to detect the heights of hills and buildings than imaging with satellites. Different types of data can be collected and layered on top of the backbone representation of the terrain in the common synthetic data space. For example, a LIDAR representation of a building can added to the backbone representation generated from satellite image data. Optical and thermal layers can also be added to the common synthetic data space. In various embodiments, lower dimensional sensor data is converted to a higher dimensional representation. For example, a LIDAR point cloud of a building is converted through processing into a three-dimensional representation of a building in the common synthetic data space. Similarly, depth maps created from optical and/or thermal data are converted through processing into three-dimensional representations. The depth maps are created by collecting optical and/or thermal data from different angles and at different distances from objects to be captured. Additional processing, as will be described herein, such as meshing, change detection, and geo-rectification are also employed in the process of converting sensor data to higher dimensional representations in a common synthetic data space.

At 206, display of the common synthetic data space is provided for. In some embodiments, display component 120 of FIG. 1 displays the common synthetic data space. The common synthetic data space may be displayed as a photorealistic or less than photorealistic rendering. The common synthetic data space contains synthetic elements (e.g., metadata, such as tags and labels identifying and associated with objects in the common synthetic data space). Different points of view (e.g., first-person, third-person, and overhead) can be selected, and the scale of the display can be adjusted. One or more layers of sensor data may be rendered on top of each other. For example, thermal data can be overlaid on an overhead satellite view. Not all objects captured by sensors need to be displayed in the common synthetic data space. For example, it may not be necessary to show all bushes or small animals. In some embodiments, decisions regarding which objects are relevant to show are made by an artificial intelligence. These decisions may also be made manually. Similarly, decisions as to what metadata to show with respect to displayed objects can be made manually or by an artificial intelligence. Examples of metadata include identification information associated with an object and uncertainty and/or ambiguity with respect to an object's identity and/or position.

At 208, a command associated with an object represented in the common synthetic data space is received. In some embodiments, processor 110 of FIG. 1 receives a command inputted by input component 118 of FIG. 1. Examples of methods for inputting commands include using voice commands, hand gestures, traditional input devices (e.g., a keyboard and mouse combination), and interactions with synthetic objects (e.g., menus) in the common synthetic data space. In various embodiments, processor 110 interprets the inputted command and transmits the command (e.g., using network interface 116 to transmit via network 106) to implement an action in a real-world environment. In some embodiments, movable asset 104 is directed to carry out an action (e.g., surveil and track an object in the real world).

Figure 3:
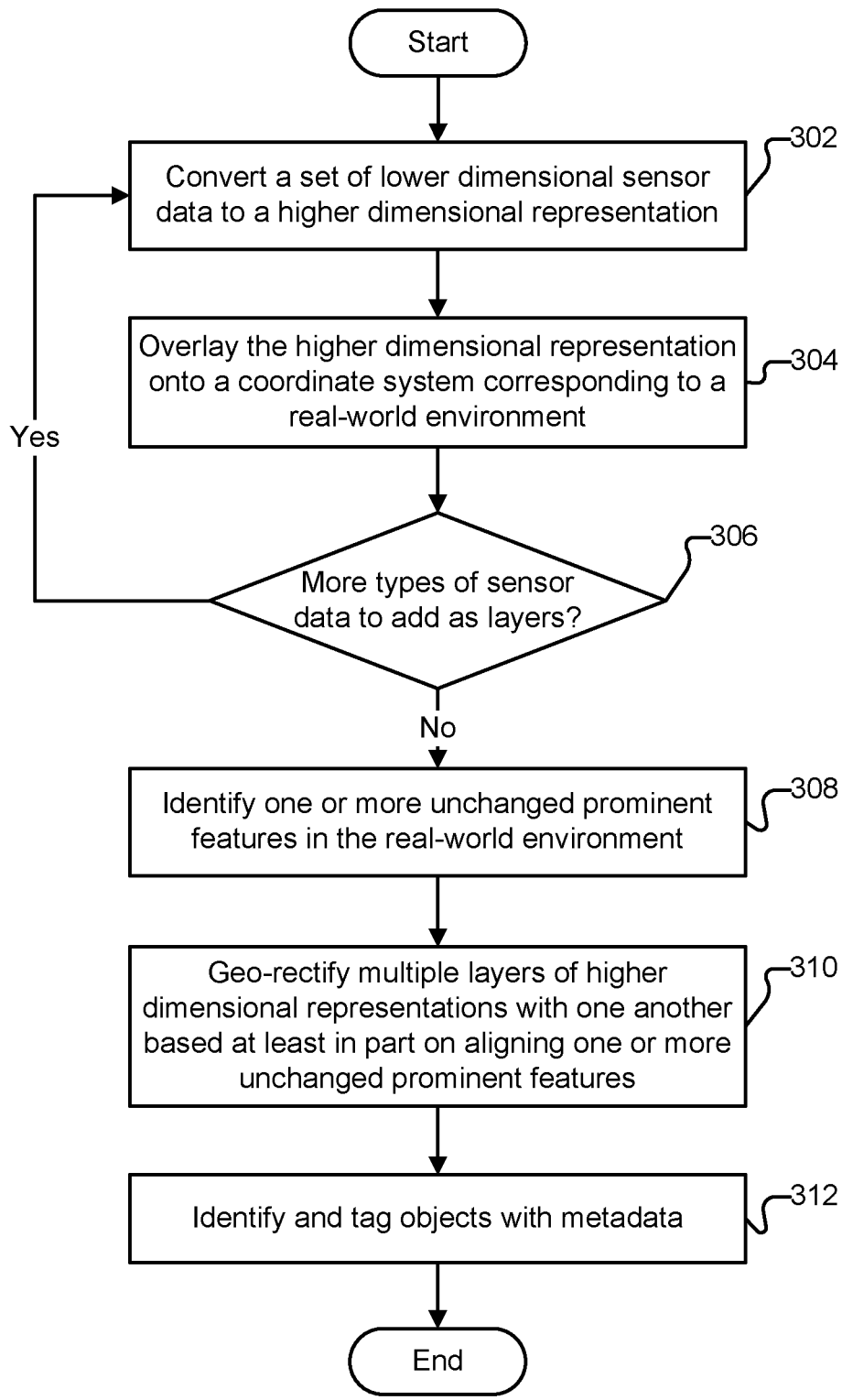
FIG. 3 is a flow chart illustrating an embodiment of a process for converting sensor data to a common synthetic data space.

FIG. 3 is a flow chart illustrating an embodiment of a process for converting sensor data to a common synthetic data space. In some embodiments, the process of FIG. 3 is implemented in processor 110 of FIG. 1. Interactive virtual interface system 108 synthesizes a recreation of the real world in a digital space. In various embodiments, a substantial portion of the common synthetic data space does not change and can be loaded without additional processing. For example, representations of hills and buildings captured by LIDAR and roads captured by satellite imagery do not need to be updated frequently after they are synthesized. In some embodiments, rendering resources are saved by rendering certain aspects of the terrain (e.g., hills and roads) as digital representations that are less than photorealistic in detail. Regardless of how frequently an object or feature of the real-world environment is captured, creation of its representation in the common synthetic data space requires converting a set of lower dimensional sensor data to a higher dimensional representation.

At 302, a set of lower dimensional sensor data is converted to a higher dimensional representation. For example, a LIDAR point cloud that is collected by a LIDAR sensor is converted to a set of surfaces (e.g., triangles and polygons) approximating a geometric domain (i.e., a mesh is created). The mesh that is created is a three-dimensional representation that exists in the common synthetic data space. Conversion of point clouds to meshes can be performed by a variety of meshing algorithms. Examples of meshing algorithms include Delaunay triangulation to build a network of triangles over existing vertices in a point cloud, ball-pivoting to grow a mesh from an initial seed triangle, and marching cubes after transformation of a point cloud into a volumetric grid. In some embodiments, a neural network, in which the input is a point cloud and the output is a mesh, is trained to generate meshes. In these embodiments, a true meshing algorithm is used on point cloud data to create examples on which the neural network is trained. For example, a convolutional neural network (CNN) with an input layer, one or more hidden convolutional, pooling, and/or fully connected layers, and an output layer can be trained to classify and associate point clouds of certain objects with corresponding meshes. After a three-dimensional representation is created by meshing, the three-dimensional representation can be textured into a photorealistic rendering by using satellite and/or other imaging data for the texturing. If less than photorealistic imaging data is used for the texturing, the three-dimensional representation will be a less than photorealistic rendering. In some embodiments, optical and/or thermal sensors are used to collect a plurality of images of objects from a multitude of angles and distances to the objects. Distances to objects can be derived from GPS triangulation. Different angles can be achieved by collecting data from multiple tower stations and/or from a moving sensor (e.g., mounted on an aerial drone). Based on collected images (e.g., optical and/or thermal images) and angle and distance information, depth maps can be created. Meshing algorithms similar to the ones used for transforming LIDAR point clouds into sets of surfaces can also be used on depth maps to generate three-dimensional representations for the common synthetic data space.

At 304, the higher dimensional representation is overlaid onto a coordinate system corresponding to a real-world environment. In various embodiments, the coordinate system is a three-dimensional coordinate system in which two dimensions correspond to longitudinal and latitudinal dimensions from satellite image data and the third dimension is altitude. Several approaches exist for determining where in the common synthetic data space to place the higher dimensional representation. As will be described herein, the overlaying step can be performed alongside a geo-rectification step based on aligning common features. In some embodiments, a physics-based approach is used to determine coordinates for one or more objects. With the coordinates of one or more objects determined precisely, those objects serve as landmarks from which coordinates of other objects are determined. For example, in embodiments where sensors are mounted on tower stations in a real-world environment, time of arrival methods (coupled with precise knowledge of the coordinates of the tower stations—for example, from GPS locators placed on the tower stations) are used to triangulate locations of objects.

At 306, it is determined whether there are more types of sensor data to add as layers in the common synthetic data space. In the event that at 306 it is determined that there are more types of sensor data to add as layers, steps 302 and 304 are repeated. For example, in addition to higher dimensional representations generated from LIDAR data, there may be higher dimensional representations generated from optical and/or thermal data that can be overlaid onto the coordinate system of the common synthetic data space.

In the event that at 306 it is determined that there are no other types of data to add as layers (i.e., all relevant data have been converted into higher dimensional representations in the common synthetic data space), at 308, one or more unchanged prominent features in the real-world environment are determined. These features are used as common features for alignment of different layers of sensor data (e.g., LIDAR, optical, and thermal). In order to use unchanged features for alignment of different layers of data, changes in a real-world environment are detected. For example, if a hill peak or a building in the real-world environment is used to align different layers of sensor data, the alignment depends on the hill peak or the building being consistent in the different layers of sensor data. If older data (e.g., satellite data) contains the hill peak or the building, but newer data (e.g., LIDAR) does not (or contains a changed version), alignment based on the hill peak or the building would not be effective. In various embodiments, a pixel-level semantic segmentation algorithm is used to detect changes between images. For example, to detect whether a building used for alignment of different layers of sensor data is still present, a recent satellite image can be compared with an older satellite image. First, a pixel-level semantic segmentation algorithm can be used to label features of the two satellite images (e.g., label objects as sky, building, road, etc.). Then a binary difference between the two satellite images is computed to determine which semantic features changed. For example, if the only pixels that are different between the two satellite images are pixels semantically labeled as "building," then a change associated with a building has occurred.

At 310, multiple layers of higher dimensional representations are geo-rectified with one another based at least in part on aligning one or more unchanged prominent features. LIDAR, optical, and thermal layers can be geo-rectified with one another based on common features, such as a building and/or a hill peak. For example, if a LIDAR scan of a scene captures a building and an optical image captured by an aerial drone surveys the same scene, the two scans can be aligned by matching common features, such as corners of the building. The LIDAR data and the drone-captured optical data can also be geo-rectified with satellite imagery data to place higher dimensional representations generated from the LIDAR data and the drone-captured optical data in a real-world based coordinate system. Typically, the most up-to-date satellite imagery data available is used to geo-rectify with real-time LIDAR and optical data.

At 312, objects are identified and tagged with metadata. Objects in the common synthetic data space are identified by automated means. Standard techniques may be used. For example, outlines of shapes can be matched to patterns in a model database after edge detection techniques are used to generate the outlines. Other features of objects can be matched, including color, subparts of the objects, and movement (e.g., speed of the objects). In some embodiments, machine learning is used to train a computer system to identify and classify objects (e.g., classify an object as a human, human tracks, an animal, animal tracks, or a vehicle). For example, a CNN with an input layer, one or more hidden convolutional, pooling, and/or fully connected layers, and an output layer can be trained to classify objects based on optical images. Metadata associated with objects are stored so that they can later be displayed. Examples of metadata include identification information associated with an object, a certainty (e.g., a percentage confidence) with respect to an identification, coordinates of the object, speed (if the object is moving), and last known coordinates and/or predicted coordinates (if the object is moving and real-time location information associated with the object is not available).

Figure 4:
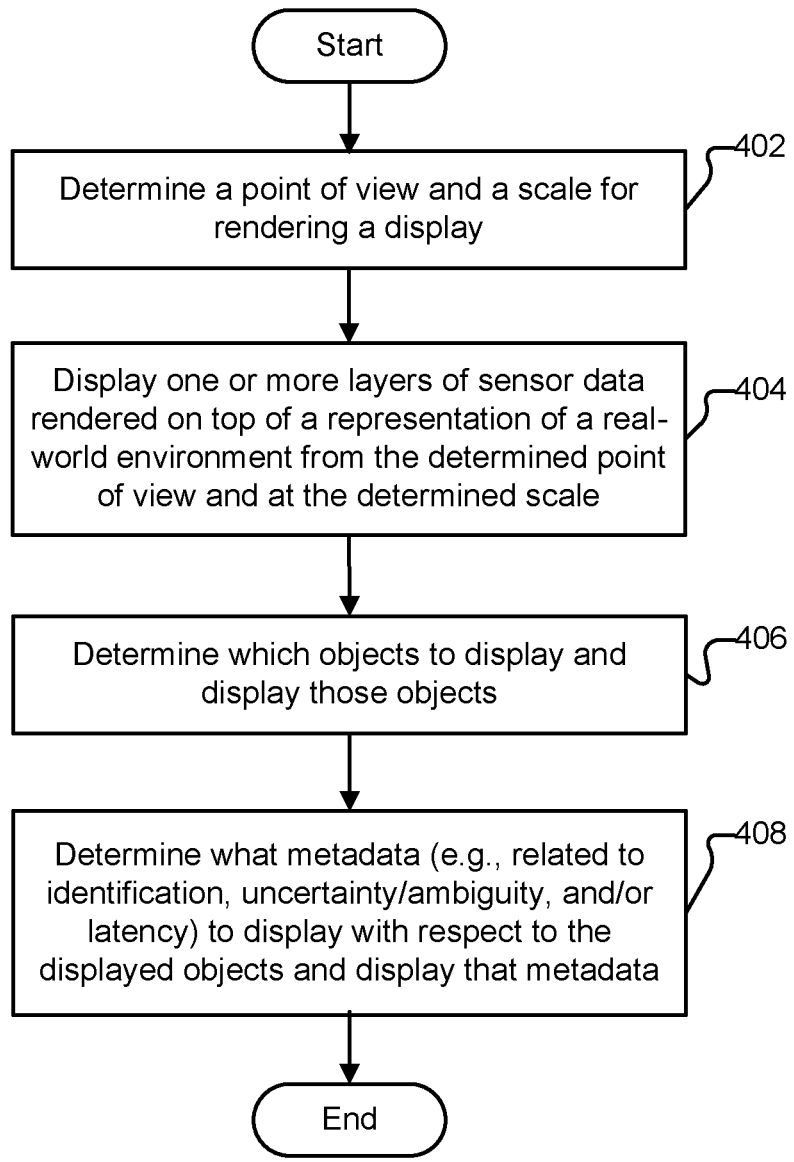
FIG. 4 is a flow chart illustrating an embodiment of a process for displaying a common synthetic data space.

FIG. 4 is a flow chart illustrating an embodiment of a process for displaying a common synthetic data space. In some embodiments, the process of FIG. 4 is implemented in interactive virtual interface system 108 of FIG. 1.

At 402, a point of view and a scale for rendering a display is determined. Examples of points of view include first-person, third-person, and overhead. Examples of scales include one-to-one real-world scale and compressed scale. For example, a first-person point of view at one-to-one real-world scale from the perspective of an object being surveilled and tracked can be selected. The common synthetic data space can be viewed from the point of view of any object in the common synthetic data space. Thus, the common synthetic data space may also be viewed from the point of view of an object doing the surveilling and tracking of an object being surveilled and tracked. The common synthetic data space may be viewed from the point of view of a synthetic object that does not correspond to a real-world object. For example, a virtual person can be created and moved around freely in the common synthetic data space, serving as a way to explore the common synthetic data space irrespective of other objects in the common synthetic data space. This virtual person may also interact with representations of real-world people and other objects in the common synthetic data space. A first-person point of view at one-to-one real-world scale (as described above) provides a strong sense of immersion. In some embodiments, the user receives a display with a scale and/or changed in perspective that is based at least in part on role or other factors (e.g., user ID, group, company, rank, etc.). For example, roles with strategic oversight over combat operations may receive a broad third person view of the battlefield with controls and permissions to provide commands to a large number of units under their control. Conversely, roles with tactical oversight over a single unit or a small number of units may receive a narrower view of the units they control, with corresponding controls and permissions. Different perspectives and scales may be more suitable when a strong sense of immersion is not required. For example, an overhead point of view at compressed scale is more appropriate for gaining an overall understanding of a terrain. In various embodiments, updates are made in real-time as long as sensor data is collected in real-time. For example, when an aerial drone follows a moving object, the location of the moving object can be determined in real-time, allowing for real-time updates to what the object is seeing from its perspective.

At 404, one or more layers of sensor data rendered on top of a representation of a real-world environment are displayed from the determined point of view and at the determined scale. For example, thermal data and optical data can be layered on top of a representation of a terrain of a real-world environment in the common synthetic data space. In some embodiments, the representation of the terrain is generated based on satellite imagery to determine relative positions of key features of the terrain and LIDAR to determine heights of features and objects. Optical data showing a moving object may be added on top to show movements of the object in real-time. In various embodiments, how much data is shown is adjustable. For example, display of an optical data layer may be adjusted so that it is focused on a specific area (e.g., an area where a moving object is located). In some embodiments, when it is completely dark, an optical data layer is removed and a thermal data layer is displayed. The thermal data layer may show all temperatures or may be adjusted to show a specific temperature range (e.g., a temperature range corresponding to human body temperatures). The thermal data layer may also be adjusted so that it is focused on a specific area (e.g., an area where people are located). A threshold may also be set. For example, in the case of a wildfire, a threshold may be set so that only certain temperatures (e.g., 500 degrees Fahrenheit and above) are displayed.

At 406, which objects to display is determined, and those objects are displayed. In some embodiments, manual rules are set to determine which objects to display. For example, a manual rule may dictate that people and cars must be displayed. Exclusion zones where nothing is shown may also be set. Other examples of items to display based on manual rules include objects coming within a specified distance of a particular building, objects in a certain area, and objects resembling human tracks. Manual rules may also be set to determine how objects and features are displayed. For example, human tracks may be color-coded according to the age of the tracks (e.g., red for recent and blue for older than an hour). In some embodiments, an artificial intelligence decides what is relevant to show. For example, based on training using examples of historical objects of interest, a neural network can classify objects according to potential interest and display the most relevant objects. In various embodiments, objects are displayed on display component 120 of FIG. 1. As will be described herein, in some embodiments, alerts may be set up with respect to certain objects to ensure that those objects are not overlooked.

At 408, what metadata to display (e.g., related to identification, uncertainty/ambiguity, and/or latency) with respect to the displayed objects is determined, and that metadata is displayed. In various embodiments, there is a certainty associated with the identification of each object (including items such as terrain features). In the event that this certainty is above a specified threshold, the object will be displayed. Some objects have such a high degree of certainty associated with them that identification labels are unnecessary and would clutter the common synthetic data space. For example, terrain features are known with a great deal of certainty and do not need identification labels. In the event that the certainty associated with the identification of an object drops below a specified threshold, an identification is displayed with an indication of confidence in the identification. For example, if an artificial intelligence algorithm identifies an object as a person with 90% confidence, an icon or label indicating "person" and "90%" may appear adjacent to the object. Color may also be used to indicate confidence. For example, the word "person" may be displayed in green to represent high confidence in the identification, yellow to represent moderate confidence, and red to represent low confidence. In some embodiments, uncertainty is flagged for further evaluation. For example, an object that resembles tracks could be tagged with a label reading "Tracks?" In various embodiments, uncertainty with respect to an object's location is represented. For example, if a specified period of time has passed since an object's location has been updated, a zone of possible locations can be displayed. This zone could be a circle centered on the object's last known location with a radius equal to the object's average speed multiplied by the period of time since the object's location was last updated. In some embodiments, a statistical model (e.g., using Kalman filtering) is used to predict an object's future location based on a series of measurements of an object's past locations. If the period of time since an object's location was last updated has been too long (i.e., exceeded a specified amount of time), the object may be tagged as lost. If an object's location is being updated in real-time, it is sufficient to show the object's updated location without representing uncertainty. In various embodiments, latency is displayed. For example, if the last known location of an object is from 10 seconds ago, a label with the time when the last location update occurred may be shown adjacent to the object. Similarly, if a command is issued to an asset and the asset has not responded, a label with the time when the command was sent may be shown adjacent to the asset.

Figure 5:
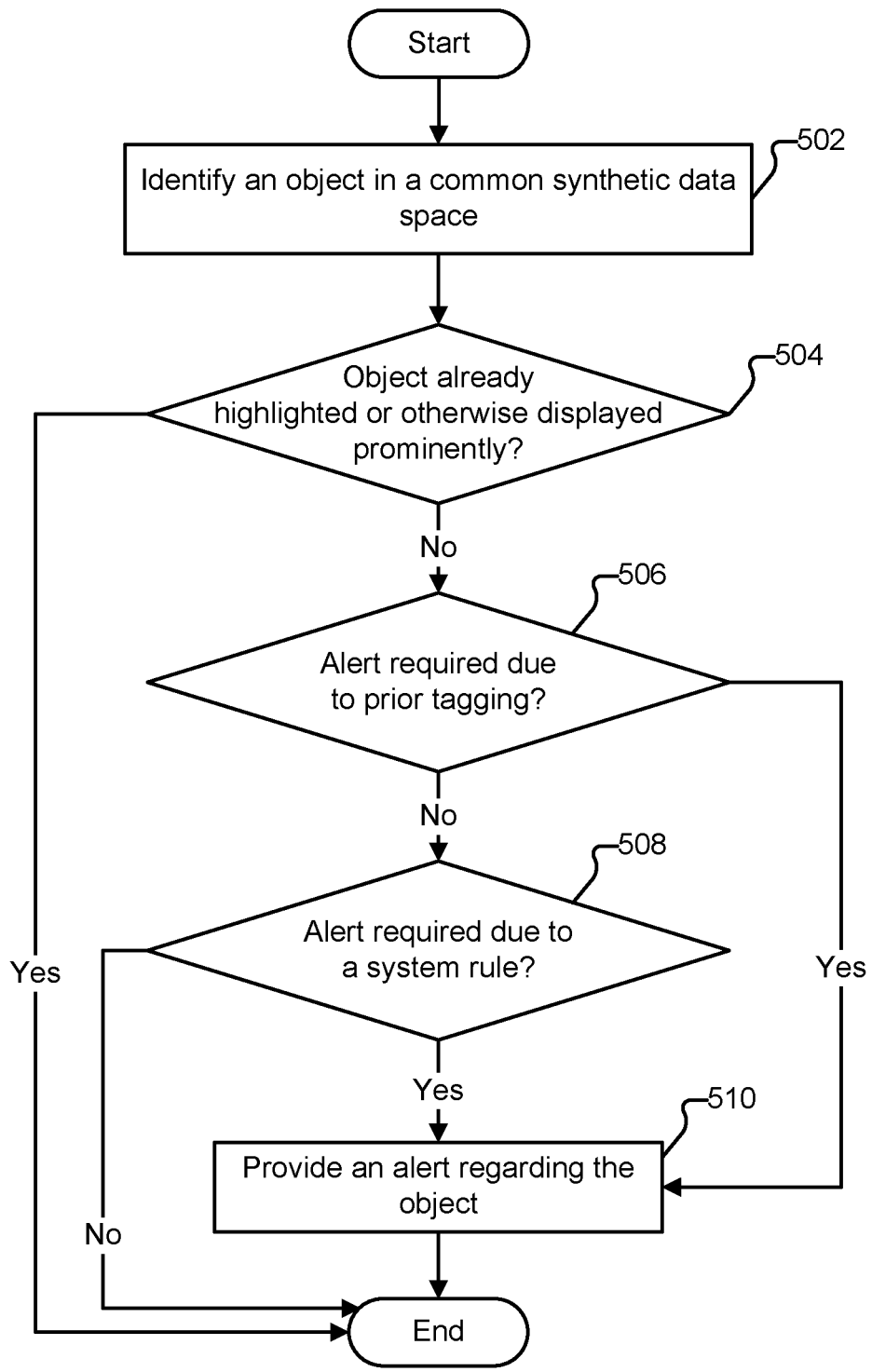
FIG. 5 is a flow chart illustrating an embodiment of a process for providing alerts.

FIG. 5 is a flow chart illustrating an embodiment of a process for providing alerts. In some embodiments, the process of FIG. 5 is implemented in interactive virtual interface system 108 of FIG. 1.

At 502, an object (e.g., a person or human tracks) in a common synthetic data space is identified. In some embodiments, a pixel-level statistical model is used to identify new objects. In this model, multiple images are collected. Examples of image types include optical images and thermal images. From the multiple images, means and standard deviations for each pixel are calculated. In addition, image processing may be performed (e.g., transformation or warping to compensate for camera motion). In the event that a pixel changes in value by more than a specified number of standard deviations over a specified period of time, a change is registered. For thermal images, a change in a pixel corresponds to a temperature change. In order to detect object-level changes rather than changes in individual pixels, a convolution filter (e.g., a box filter) is used to smooth out pixel level changes across an object-sized region. For example, if person-sized change detection is desired, the box filter is chosen to correspond to approximately the number of pixels taken up by a person in the images being analyzed.

At 504, it is determined whether the object is already highlighted or otherwise displayed prominently. If at 504 it is determined that the object is already highlighted or otherwise displayed prominently, then no further action is taken. For example, if new tracks are already shown in a bright color and are in the field of vision of a user to which an alert would be directed, no alert may be required due to the high likelihood that the user is already aware of the new tracks.

In the event that at 504 it is determined that the object is not already highlighted or otherwise displayed prominently, at 506, it is determined whether an alert is required due to prior tagging. In the event that at 506 it is determined that an alert is required due to prior tagging, at 510, an alert regarding the object is provided. For example, an object identified as new tracks may trigger an alert because the new tracks resemble previously tagged tracks. Examples of indications that new tracks resemble previously tagged tracks include the new tracks being in a similar location as the previously tagged tracks, the new tracks being found with a similar number of other tracks as were found with the previously tagged tracks, and the new tracks having similar characteristics (e.g., imprint size and distance between imprints) as those of the previously tagged tracks. Similarly, an alert may be triggered in the event that a previously tagged object (e.g., a person or vehicle) reappears.

In the event that at 506 it is determined that an alert is not required due to prior tagging, at 508, it is determined whether an alert is required due to a system rule. In the event that at 508 it is determined that an alert is required due to a system rule, at 510, an alert regarding the object is provided. Examples of system rules include providing an alert any time a new person-sized object is detected, any time new tracks are detected, and any time an object enters a zone of interest (e.g., an exclusion zone). In the event that at 508 it is determined that an alert is not required due to a system rule, then no further action is taken.

At 510, an alert regarding the object is provided. Examples of alerts include an audio notification describing the nature of the alert, a flashing visual notification describing the nature of the alert, and any other type of notification that is capable of capturing the attention of a user. In various embodiments, the alert is displayed by display component 120 of FIG. 1.

Figure 6:
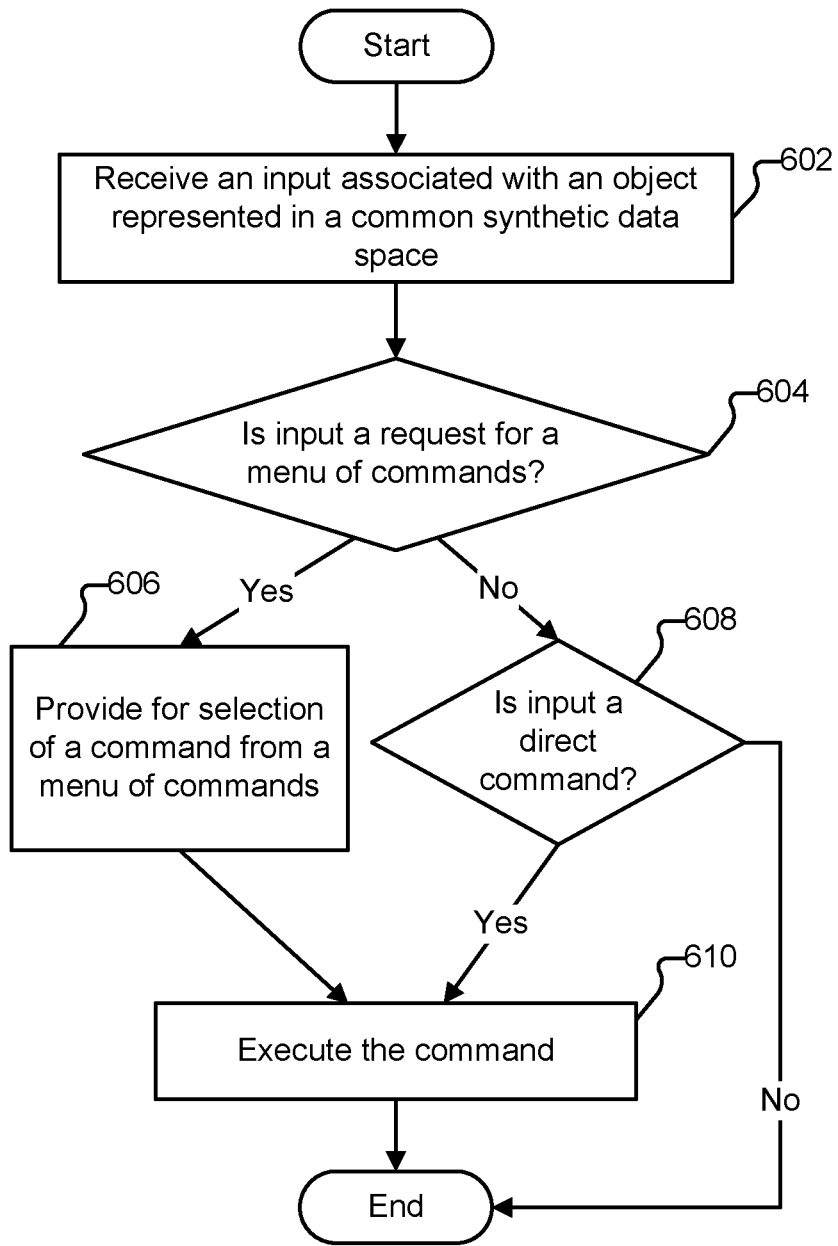
FIG. 6 is a flow chart illustrating an embodiment of a process for receiving a command associated with an object represented in a common synthetic data space.

FIG. 6 is a flow chart illustrating an embodiment of a process for receiving a command associated with an object represented in a common synthetic data space. In some embodiments, the process of FIG. 6 is implemented in interactive virtual interface system 108 of FIG. 1.

At 602, an input associated with an object represented in a common synthetic data space is received. In some embodiments, input component 118 of FIG. 1 is used to provide the input. For example, gloves with position sensors can be used to track hand movements that correspond to virtual movements (e.g., movements of virtual hands or a cursor) in the common synthetic data space, and virtual movements such as tapping on an object in the common synthetic data space can indicate an input is being given. Other ways in which inputs can be received include through voice commands and traditional input devices (e.g., a keyboard and mouse combination).

At 604, it is determined whether the input is a request for a menu of commands. In some embodiments, inputs associated with certain objects automatically trigger a request for a menu of commands. For example, tapping or clicking on a person in the common synthetic data space may trigger a menu of commands associated with the person. In addition, relevant information (e.g., speed, location, and identity) associated with the person may be displayed. In some embodiments, a request for a menu of commands is made through voice input. In the event that at 604 it is determined that the input is a request for a menu of commands, at 606, selection of a command from a menu of commands is provided for. For the example in which a person in the common synthetic data space is tapped or clicked on, possible commands include commands to surveil and/or track the person with a drone, orbit around the person with a drone, and follow the person with a drone but position the drone between the person and the sun to keep the drone hidden. In the event that at 604 it is determined that the input is not a request for a menu of commands, at 608, it is determined whether the input is a direct command. In the event that at 608 it is determined that the input is not a direct command (i.e., no command is to be given), then no further action is taken.

At 610, the command (e.g., selected from a menu of commands or a direct command) is executed. In some embodiments, processor 110 of FIG. 1 uses network interface 116 of FIG. 1 to issue a command via network 106 of FIG. 1 to movable asset 104 of FIG. 1. For example, if movable asset 104 is an aerial drone, possible commands include commands to surveil and/or track an object, use sensors mounted on the aerial drone to build a scan of the object, drop an item near or deliver an item to the object, patrol a specified area, conduct a search in a specified area, and monitor a specified area (e.g., a doorway and/or window in a building). Commands do not need to invoke an action by a movable object. For example, possible commands associated with a person include commands to display information about the person, communicate with the person, display a line of sight that the person sees, mark the person with a status (e.g., friendly or hostile), highlight the person, modify a color associated with the person, and associate an audio cue (e.g., a beeping sound) with the person. Commands are also possible with respect to locations in the common synthetic data space. For example, a pin can be dropped at a specified location to mark an assembly point. In some embodiments, after a command is issued, an icon is displayed to indicate the command has been issued. For example, a loading indicator may be displayed adjacent to an aerial drone that received a patrol command. After the command is received and acknowledged, the loading indicator is removed.

Figure 7:
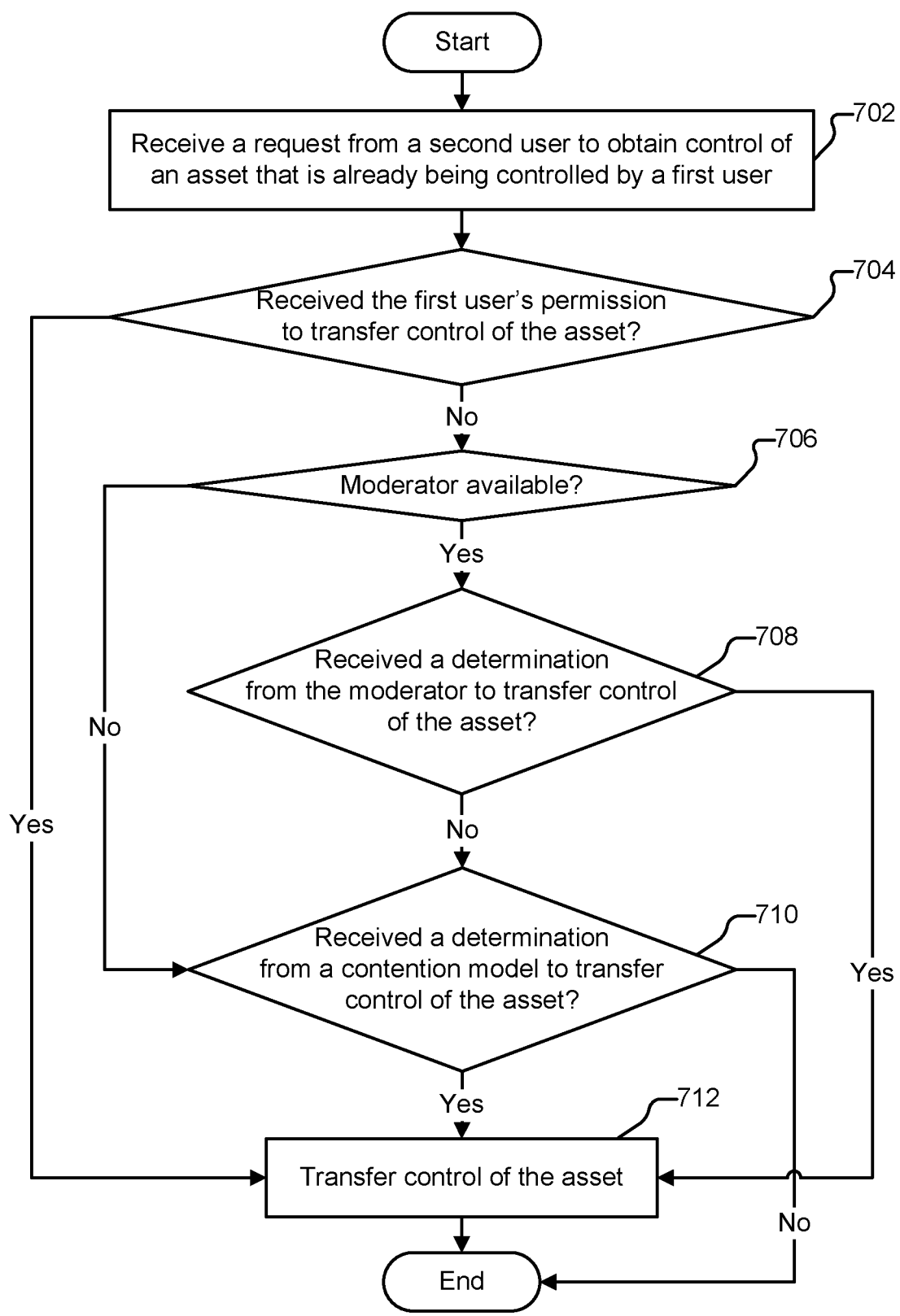
FIG. 7 is a flow chart illustrating an embodiment of a process for determining control over an asset.

FIG. 7 is a flow chart illustrating an embodiment of a process for determining control over an asset. In some embodiments, the process of FIG. 7 is implemented in interactive virtual interface system 108 of FIG. 1.

At 702, a request from a second user to obtain control of an asset that is already being controlled by a first user is received. Determining control over assets is an issue when multiple users interact in a common synthetic data space. Multiple users view the same representations in the common synthetic data space and may want to control the same objects. Examples of assets for which control is desired include aerial drones, land-based drones, manned vehicles, and one or more human personnel on foot. In some embodiments, processor 110 of FIG. 1 receives the request for control of an asset that is already being controlled.

At 704, it is determined whether the first user's permission to transfer control of the asset has been received (the initial permissions may be set by an administrator or privileged user based on a predetermined access control schema). In some embodiments, a first step in resolving a conflict over control of an asset is to direct the parties seeking control of the asset to attempt to resolve the conflict by themselves. In some embodiments, interactive virtual interface system 108 of FIG. 1 relays the second user's request to control the asset to the first user. In the event that at 704 it is determined that the first user's permission to transfer control of the asset has been received, at 712, control of the asset is transferred to the second user.

In the event that at 704 it is determined that the first user's permission to transfer control of the asset has not been received, at 706, it is determined whether a moderator is available. A moderator is an agent that determines priority with respect to control of assets. The moderator may be a person who has authority to make such determinations. The moderator may vary according to the asset for which control is desired. For example, if an asset is tasked to a specific operation, the moderator may need to be a person actively engaged in the operation or overseeing the operation. In some embodiments, the moderator is an artificial intelligence that has been trained to make determinations regarding priority. In the event that at 706 it is determined that no moderator is available, at 710, a contention model is examined to determine whether to transfer control of the asset. A moderator may not be available because no moderator is being used or the moderator is not responsive.

In the event that at 706 it is determined that a moderator is available, at 708, it is determined whether a determination from the moderator to transfer control of the asset has been received. In the event that at 708 it is determined that a determination from the moderator to transfer control of the asset has been received, at 712, control of the asset is transferred to the second user. Otherwise, at 710, a contention model is examined to determine whether to transfer control of the asset.

At 710, it is determined whether a determination from a contention model to transfer control of the asset has been received. In some embodiments, the contention model is based on designated ranks of users. For example, if the second user has a higher rank than the first user, it may be determined that the second user has priority with respect to the asset. Rank may be operation-specific. For example, only higher ranked users actively engaged in an operation tasked with the asset may be allowed to obtain control of the asset. In the event that at 710 it is determined that a determination from a contention model to transfer control of the asset has been received, at 712, control of the asset is transferred to the second user. Otherwise, no further action is taken.

At 712, control of the asset is transferred. In some embodiments, interactive virtual interface system 108 of FIG. 1 manages the transfer of control of an asset. In some embodiments, status information associated with assets is displayed, in which case information regarding who has control of the asset is updated.

Figure 8A:
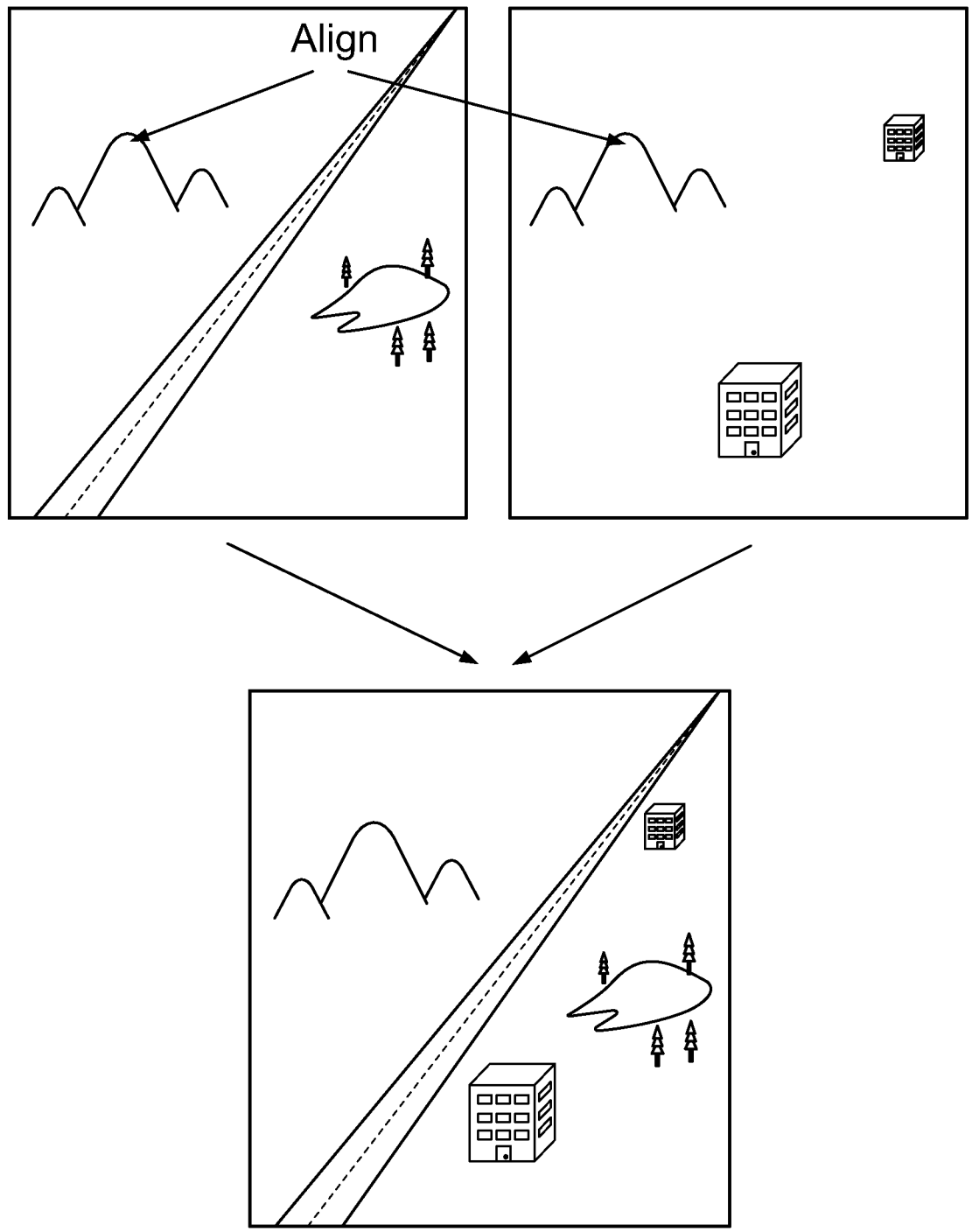
FIGS. 8A-8E are diagrammatic depictions illustrating embodiments of displays.
Figure 8B:
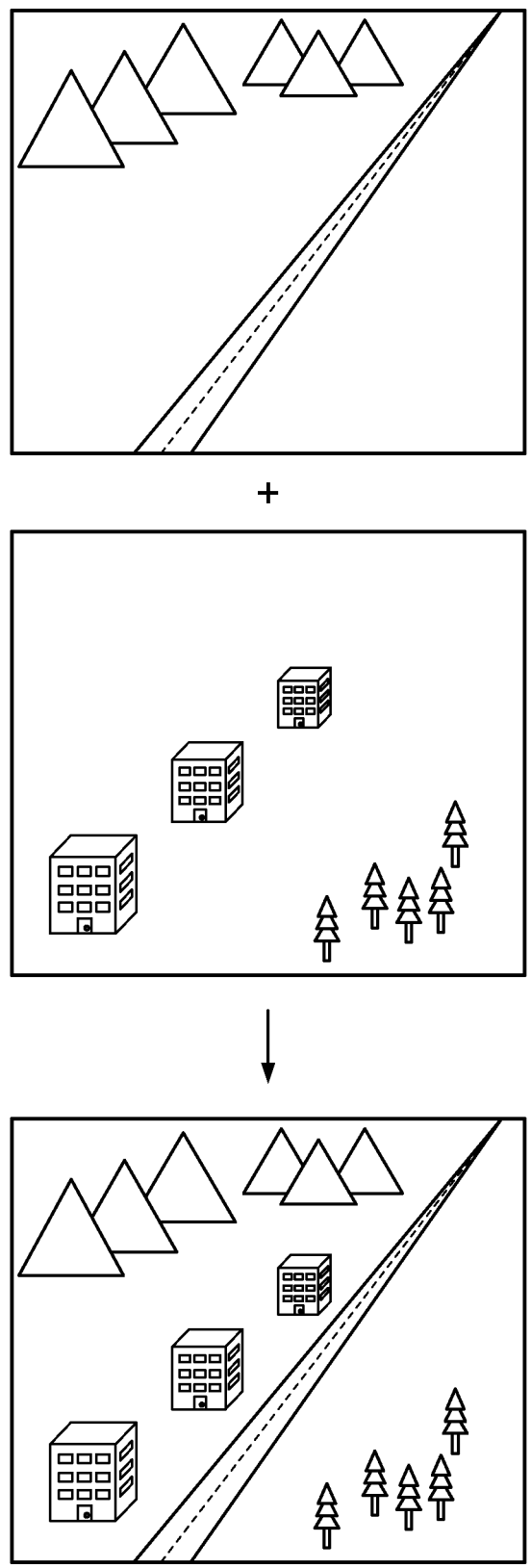
Figure 8C:
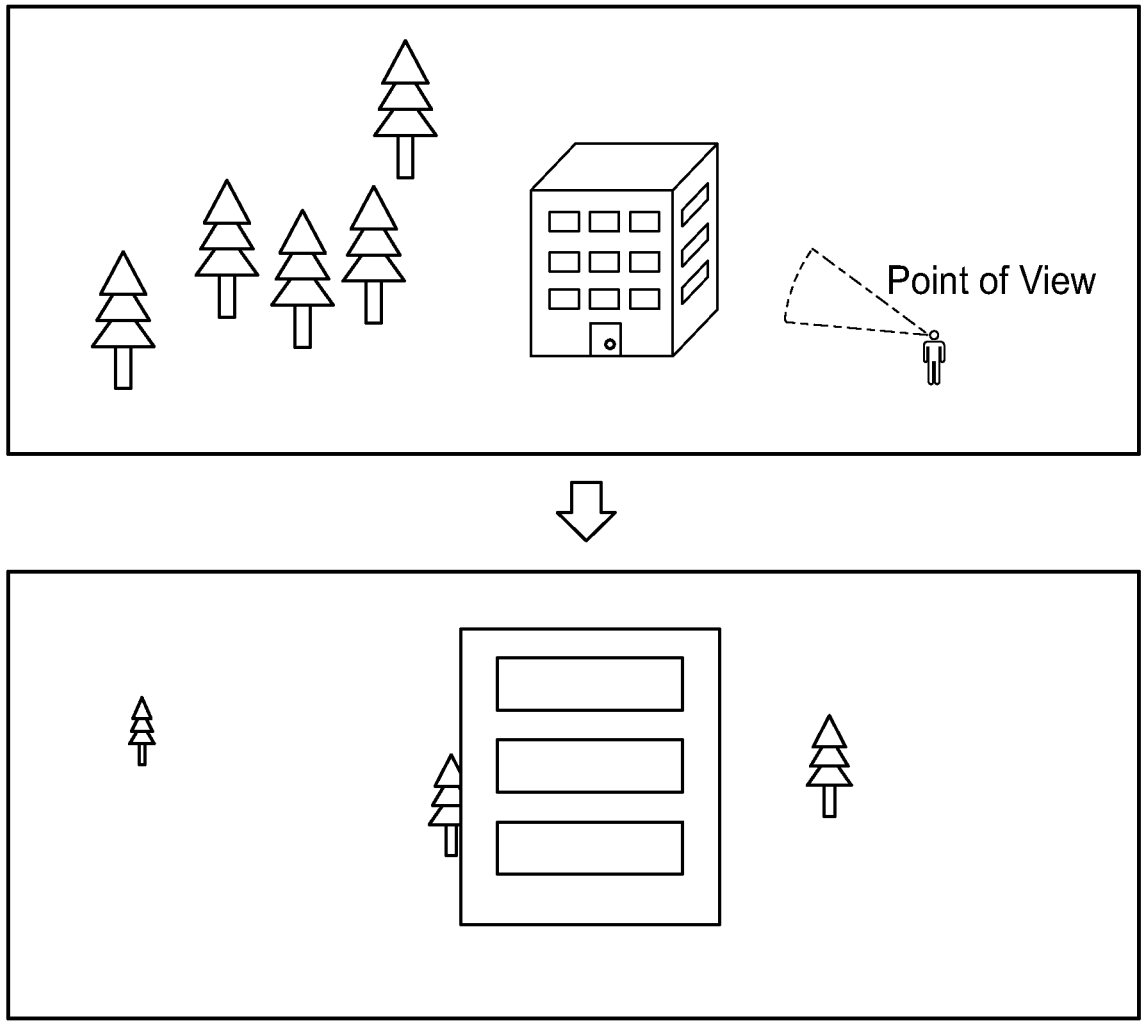
Figure 8D:
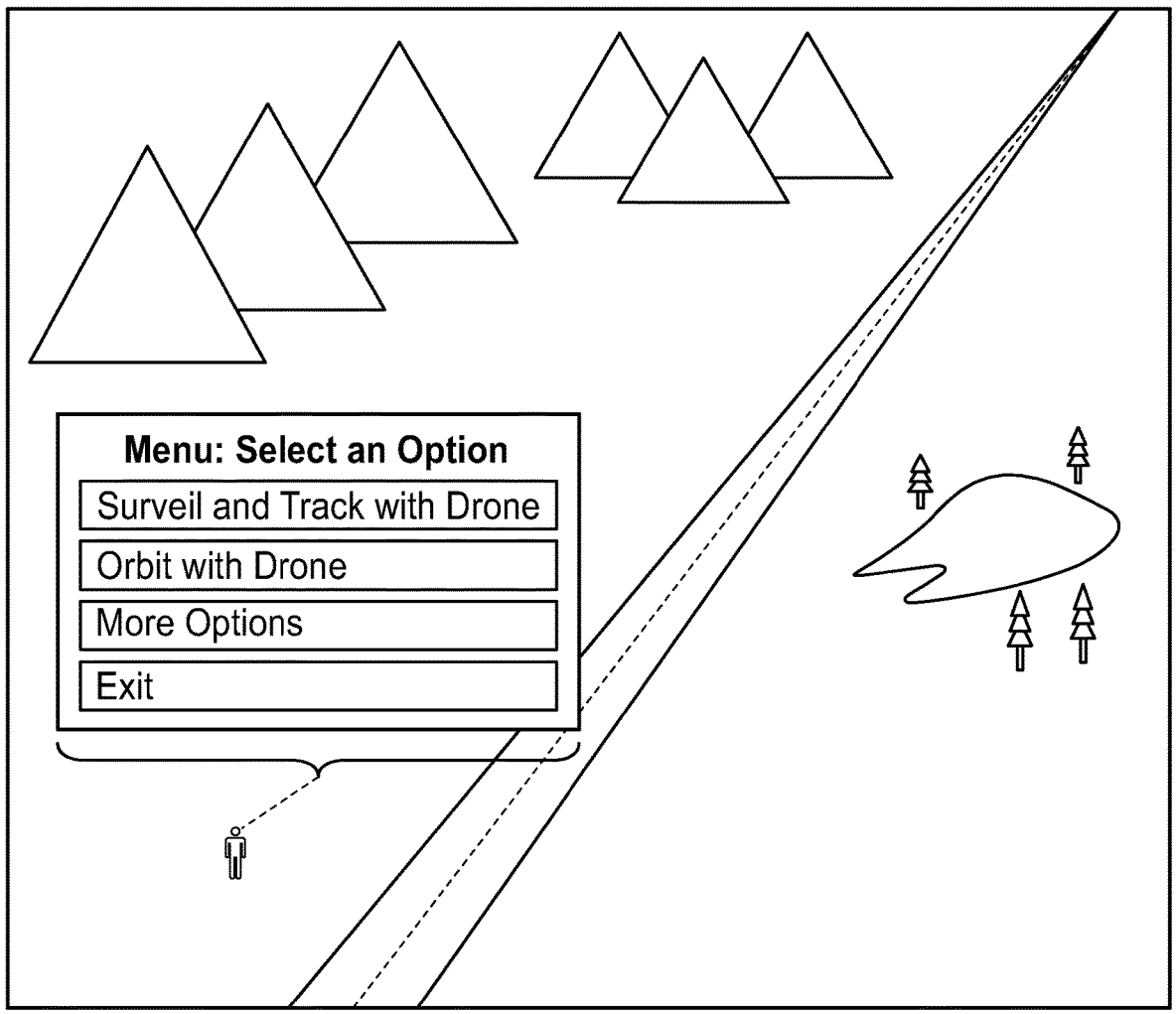
Figure 8E:
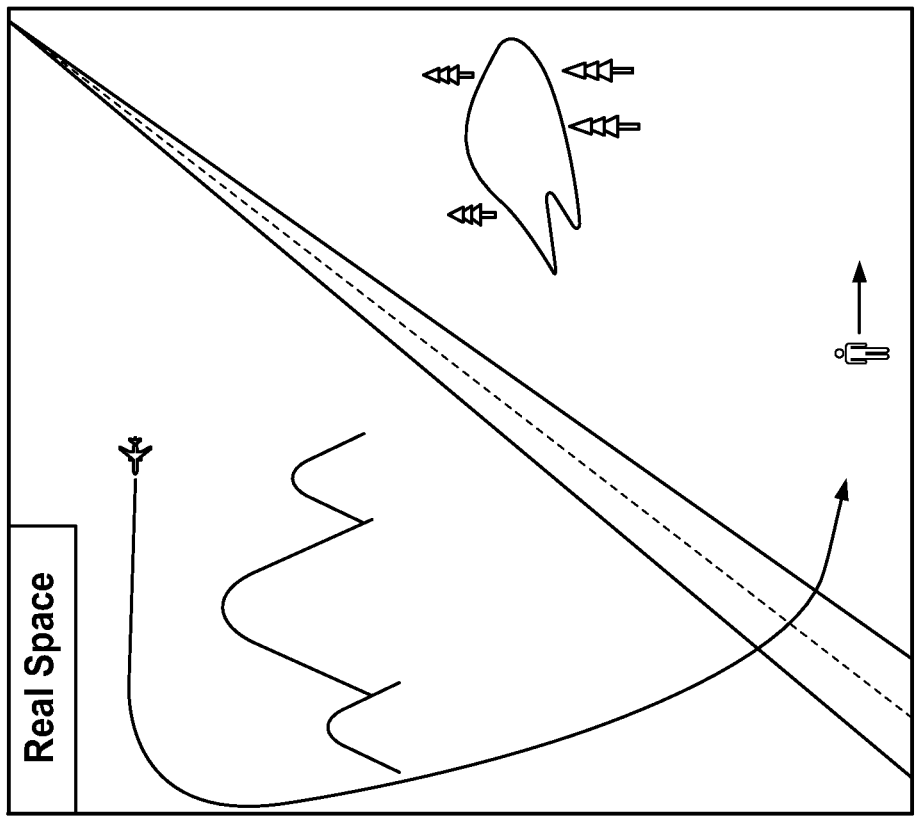
Figure 8E:
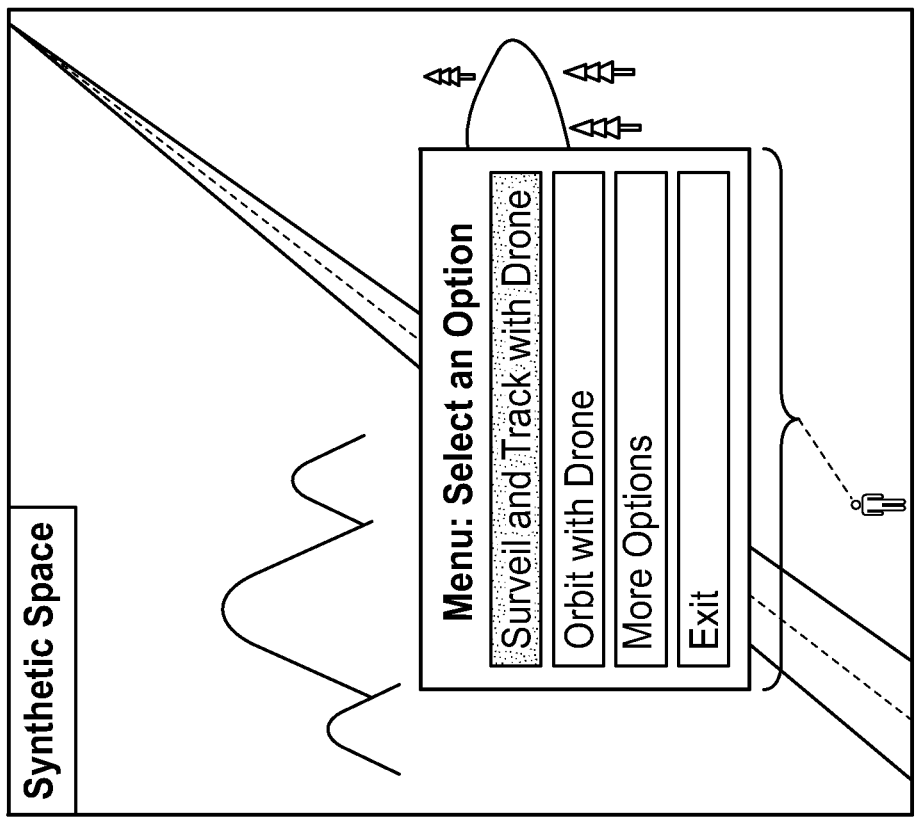

FIGS. 8A-8E are diagrammatic depictions illustrating embodiments of displays. FIG. 8A depicts using a prominent feature to align multiple layers of higher dimensional representations, as is described in step 310. In the example shown, a hill peak is used to align a representation shown on the left side of the figure (e.g., derived from satellite imagery) with another representation shown on the right side of the figure (e.g., derived from LIDAR data) to produce a rectified combination. FIG. 8B depicts displaying a common synthetic data space by overlaying one or more layers of data, as is described in step 404. The top diagram represents terrain features (e.g., collected via satellite imagery). The middle diagram represents objects captured using a different type of sensor (e.g., LIDAR). The bottom diagram represents an integration of the top and middle diagrams to form a rendering of a common synthetic data space. FIG. 8C depicts displaying a point of view from an object in a common synthetic data space, as is described in step 404. In the example shown, the point of view is a first-person point of view from a person in the common synthetic data space (as represented by the top diagram). The bottom diagram depicts what would be seen from that first-person point of view. FIG. 8D depicts a menu of commands associated with an object, as is described in step 606. In the example shown, the menu of commands is associated with actions with respect to a person. FIG. 8E depicts an action of an asset in the real world in response to a command issued in a common synthetic data space, as is described in step 610. In some embodiments, a command is sent directly to an asset (e.g., a drone or to a tower). In some cases, the drone could be perched somewhere (in a landing zone or whatever) and be commanded to track a target. In the example shown, in response to a surveil and track command with respect to a person (shown on the left side of the figure), an aerial drone moves into a tracking position behind the person, moving in the same direction as the person (shown on the right side of the figure).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for user display and interaction, comprising:
   an interface configured to receive data from one or more sensors; and
   a processor configured to:
   convert the data to a common synthetic data space;
   provide the common synthetic data space for display;
   receive a command associated with an object represented in the common synthetic data space;
   issue the command to a real-world moveable asset, wherein the asset is represented in the common synthetic data space, and wherein the command directs the asset to carry out an action associated with the object;
   determine whether the real-world moveable asset has responded to the command; and
   in response to a determination that the real-world moveable asset has not responded to the command, cause display in the synthetic data space of an issuance time of the command.

2. The system of claim 1, wherein the processor is further configured to cause display of an icon in the synthetic data space indicating the command has been issued to the asset, wherein the icon is displayed adjacent to the object in the common synthetic data space.

3. The system of claim 2, wherein the icon comprises a loading indicator.

4. The system of claim 1, wherein the processor is further configured to receive an acknowledgement of the command from the asset.

5. The system of claim 4, wherein the processor is further configured to cause removal of display of the icon in response to receiving the acknowledgement of the command from the asset.

6. The system of claim 1, wherein the data received includes one or more of: LIDAR data, optical imaging data, thermal data, and/or data collected by a drone.

7. The system of claim 1, wherein converting the data to a common synthetic data space comprises converting a lower dimensional data to a higher dimensional representation.

8. The system of claim 1, wherein providing the common synthetic data space for display includes one or more of: providing a first-person point of view from the object represented in the common synthetic data space, a third-person point of view from the object represented in the common synthetic data space, and/or an overhead point of view of at least a portion of the common synthetic data space.

9. The system of claim 1, wherein providing the common synthetic data space for display includes allowing for adjustments of scale associated with a point of view.

10. The system of claim 1, wherein the display of the common synthetic data space combines a plurality of layers of sensor data.

11. The system of claim 1, wherein the display of the common synthetic data space includes providing updated locations of one or more objects.

12. The system of claim 1, wherein the command received includes one or more of a voice command, a hand gesture command, and/or a command initiated using a computer interface device.

13. The system of claim 1, wherein the command issued to the asset is to monitor the object represented in the common synthetic data space and that object corresponds to a real-world object.

14. The system of claim 1, wherein the command is received by the asset from one or more issuers.

15. The system of claim 1, wherein the processor is further configured to display a menu indicating one or more possible commands associated with the object.

16. The system of claim 1, wherein the processor is further configured to give an alert regarding an item of potential interest.

17. The system of claim 16, wherein the item of potential interest includes a reappearance of a previously tagged object.

18. The system of claim 16, wherein the item of potential interest includes an entry of a second object into a zone of interest.

19. A method of user display and interaction, comprising:
receive data from one or more sensors;
converting, using a processor, data to a common synthetic data space;
providing the common synthetic data space for display;
receiving a command associated with an object represented in the common synthetic data space;
issuing the command to a real-world moveable asset, wherein the asset is represented in the common synthetic data space, and wherein the command directs the asset to carry out an action associated with the object;
determining whether the real-world moveable asset has responded to the command; and
in response to a determination that the real-world moveable asset has not responded to the command, causing display in the synthetic data space of an issuance time of the command.

20. A computer program product for user display and interaction, the computer program product being embodied in a non-transitory computer readable storage medium and comprising computer instructions for:
receive data from one or more sensors;
converting, using a processor, data to a common synthetic data space;
providing the common synthetic data space for display;
receiving a command associated with an object represented in the common synthetic data space;
issuing the command to a real-world moveable asset, wherein the asset is represented in the common synthetic data space, and wherein the command directs the asset to carry out an action associated with the object;
determining whether the real-world moveable asset has responded to the command; and
in response to a determination that the real-world moveable asset has not responded to the command, causing display in the synthetic data space of an issuance time of the command.

* * * * *